United States Patent [19]

Minbu

[11] Patent Number: 5,038,906

[45] Date of Patent: Aug. 13, 1991

[54] CLUTCH DISC ASSEMBLY

[75] Inventor: Shouhei Minbu, Neyagawa, Japan

[73] Assignee: Kabushiki Kaisha Daikin Seisakusho, Osaka, Japan

[21] Appl. No.: 442,360

[22] PCT Filed: Mar. 31, 1989

[86] PCT No.: PCT/JP89/00352

§ 371 Date: Nov. 17, 1989

§ 102(e) Date: Nov. 17, 1989

[87] PCT Pub. No.: WO89/09888

PCT Pub. Date: Oct. 19, 1989

[30] Foreign Application Priority Data

Apr. 5, 1988 [JP] Japan ............................. 63-46594[U]
Mar. 31, 1989 [JP] Japan .................... PCT/JP89/00352

[51] Int. Cl.$^5$ ...................... F16D 13/64; F16F 15/12; F16F 15/30
[52] U.S. Cl. .................................... 192/106.2; 464/64
[58] Field of Search ...................... 192/106.2; 464/64; 267/168, 170, 178

[56] References Cited

U.S. PATENT DOCUMENTS

| 2,158,244 | 5/1939 | Mistretta et al. | 192/106.2 |
| 2,920,733 | 1/1960 | Lysett | 464/64 X |
| 4,591,348 | 5/1986 | Takeuchi et al. | 464/64 |
| 4,690,660 | 9/1987 | Hashimoto | 464/68 |
| 4,743,217 | 5/1988 | Tojima et al. | 464/64 X |
| 4,884,996 | 12/1989 | Schmitt et al. | 192/106.2 X |

FOREIGN PATENT DOCUMENTS

| 2248440 | 5/1975 | France | 192/106.2 |
| 57-29072 | 6/1982 | Japan . | |
| 58-155433 | 10/1983 | Japan . | |
| 0001813 | 1/1984 | Japan | 192/106.2 |
| 59-8693 | 2/1984 | Japan . | |
| 61-41019 | 2/1986 | Japan . | |
| 2159241 | 11/1985 | United Kingdom | 464/64 |

Primary Examiner—Rodney H. Bonck
Attorney, Agent, or Firm—Armstrong, Nikaido, Marmelstein, Kubovcik, & Murray

[57] ABSTRACT

A clutch disc assembly comprising a hub, an outer flange formed on the hub; clutch plate and retaining plate with respective circumferential openings in the plates and a large diameter spring disposed in the openings, characterized by that the outer flange has a circumferentially opening larger than the openings in the plates; the large diameter spring having a hat-shaped first spring seat having a flange portion, a cylindrical portion and a bottom portion; a small diameter spring having a portion disposed in the cylindrical portion; a second spring seat; a coil spring seat for the second spring seat having an outer periphery being in contact with the flange portion of the first spring seat when the relative movement exceeds a predetermined value; and claw portions formed at both sides edges of the openings on the plates.

3 Claims, 3 Drawing Sheets

CLUTCH DISC ASSEMBLY

TECHNICAL FIELD

This invention relates to a clutch disc assembly for passenger cars, or the like.

BACKGROUND ART

A conventional clutch disc assembly of this type, an arrangement shown in FIG. 5 has already known. In the arrangement of FIG. 5, a hub 100 has an integral outwardly extending outer flange 101 formed therearound. The outer flange 101 has a pair of side plates 102 rotatably disposed at opposite sides of the outer flange 101. The outer flange 101 and side plates 102 have, respectively, formed therein openings 103 and 104 aligned with each other at equal distance in a circumferential direction. The openings 103 and 104 have disposed therein a coil spring mechanisms 105 compressibly in the circumferential direction. One of the side plates 102 is a clutch plate and has fastened thereto a friction facing 106 by way of cushioning plates 107.

According to the above mentioned arrangement, torque of an engine is transmitted to the side plates 102 by way of the friction facing 106, and therefrom to outer flange 101 by way of coil spring mechanisms 105 disposed in the openings 103 and 104, and an output shaft (not shown).

As shown in FIG. 16, in the foregoing arrangement, there are many cases that the coil spring mechanisms consist of concentrically arranged compressible coil springs 110 and 120 of respecitively large and small diameters. The springs 110 and 120 have, respectively, high and low spring constants for a multi-stage characteristic.

However, in such conventional arrangement, because the small diameter spring 110 is compressed during whole stages, compressing quantity of the small diameter spring 110, and therefore the stress thereon, are too large. The small diameter spring 110 may also mesh with the large diameter spring 120 which causes the large diameter spring 120 to the affected when the small diameter spring 110 receives centrifugal force, urging the spring 110 to a radially outer direction.

The small and large diameter springs may be arranged in series (e.g. U.S. Pat. No. 4,690,660).

However, when so arranged the circumferential distance of the openings and the spring mechanisms become large and the outer flange must be designed to maintain durability despite the circumferentially elongated openings. Thus, the arrangement is difficult to carry.

DISCLOSURE OF THE INVENTION

In a clutch disc assembly having openings in which coil spring mechanisms are disposed and, respectively, high and low spring constants for multi-stage characteristic, an object of this invention is to obtain two stages from an opening by utilizing an inner space with a large diameter spring.

Another object of this invention is to maintain the durability of the outer frange formed the hub.

Another object of this invention is to prevent the small diameter spring from meshing with large diameter spring.

Another object of this invention is to prevent the small diameter spring from over compressing.

As shown in FIGS. 1–3, a clutch disc assembly comprising a hub 1 is spline fitted onto an output shaft and has an outer flange 2 formed on the hub 1 a clutch plate 4 and retaining plate 7, respectively, rotatably disposed at opposite sides of the outer flange 2 with openings 8 and 9 aligned with each other at equal distance in a circumferential direction. A large diameter spring 19, of high spring constant, is disposed in the openings 8 and 9. The outer flange 2 has a circumferentially long opening 3, aligned with the openings 8 and 9, the circumferential width W1 being wider than width W2 of openings 8 and 9 so as to have a space corresponding to a torsion angle $\theta 1$ when the clutch is neutral. The large diameter spring 19 has a hat-shaped first spring seat 20, having an integral radially extending flange portion 24 through which the large diameter spring is compressed, a cylindrical portion 22 which goes in the large diameter spring 19 and a bottom portion 23, formed integrally at the top of the cylindrical portion 22. A small diameter spring 40 of low spring constant has one of its end portions disposed in the cylindrical portion 22 of spring seat 20. A second spring seat 41 receives the end portion of the small diameter spring 40 and is disposed opposite to the bottom portion 23 of spring seat 20. A coil spring seat 42 of the second spring seat 41 has an outer periphery in contact with the flange portion 24 of the first spring seat 20 when the relative movement of spring seat 41 exceeds a predetermined value claws 30 and 31 and 34 and 35, respectively, are formed at opposite sides, adjacent the openings 8 and 9, on the clutch plate 4 and retaining plate 7 so that the second spring seat 41, placed at opposite direction of rotation R, moves toward the flange portion 24 of the first spring seat 20 aligned with the same opening 3.

The coil spring seat portion 42 of, small diameter spring 40, contacts with the flange portion 24, of large diameter portion 19.

BEST MODE FOR CARRYING OUT THE INVENTION

Figure 1:
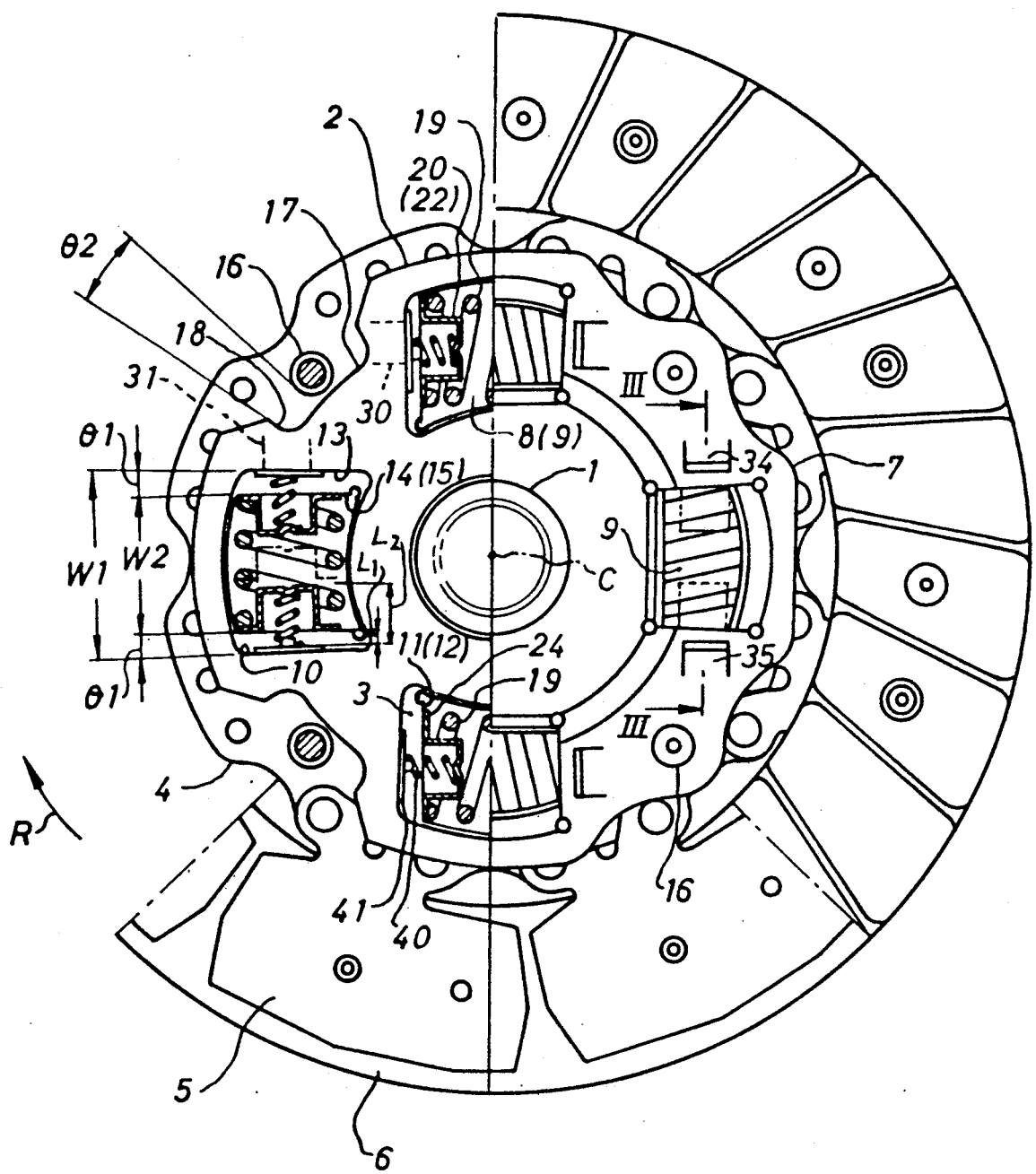
FIG. 1 is a partial broken away front elevational view of clutch disc assembly of the present invention.

In FIG. 1, showing an embodiment of the present invention, 1 is a hub spline fitted onto an output shaft (only center C is shown) and slidably in an anxial direction. The hub 1 has, integrally formed therearound, an outer flange 2. Flange 2 has formed therein circumferentially long openings 3 provided with ninety degree distances therebetween in the circumferential direction of the outer flange 2. A clutch plate, at 4, has fastend thereto a set of cushioning plates 5. The plates 5 have bonded thereon a facing 6. 7 is a retaining plate. Plates 4 and 7 are rotatably disposed at opposite sides of the outer flange 2 and have formed therein rectangular-shaped openings 8 and 9 provided at ninety degree intervals therebetween in the circumferential direction.

The openings 8 and 9 in plates 4 and 7 align with the long opening 3 in flange 2 when the clutch disc assembly is in a neutral position. The opening 3 in flanged 2 has a circumferential width W1 which is wider than the width W2 of openings 8 and 9 to have spaces respectively corresponding to the torsion angles $\theta 1$. The spaces are formed between circumferential one end surface 10 of opening 3 and the circumferential other end surfaces 11 and 12 of openings 8 and 9, in plates 4 and 7 and between circumferential another end surface 13 of long opening 3 and the circumferential one end surfaces 14 and 15 of openings 8 and 9 when the clutch is in a neutral position. Stud pins, at 16, respectively, connect the four outer peripheral portions of clutch plate 4 to the retaining plate 7. The outer flange 2 has formed therein circumferentially extending recesses 17 aligned with the stud pins 16. Each recess 17 has spaces formed between end surface 18 of each recess 17 and the corresponding stud pin 16. Each space is corresponding to a torsion angle $\theta 2$. A large diameter spring 19 of high spring constant, is disposed in the openings 3, 8 and 9 and is compressible in the circumferential direction.

Figure 2:
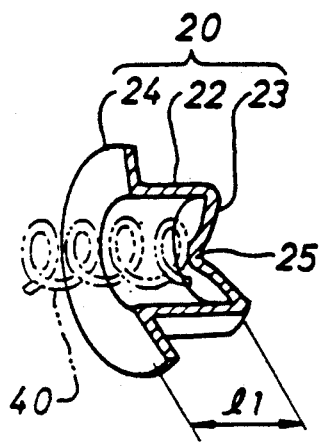
FIG. 2 is a perspective view, partially broken away, of a first spring seat according to the present invention.

FIG. 2 is a perspective view, partially broken away, of a first spring seat 20 according to the present invention. As shown in the figure, the first spring seat 20 is made of the hat-shaped steel metal having a cylindrical portion 22, a bottom portion 23 formed integrally at one end of the cylindrical portion 22, and a flange portion 24 formed integrally at the other end of the cylindrical portion 22. The bottom portion 23 has a domed center 25 formed thereon and projecting toward the inside of the cylindrical portion 22 and into small diameter spring 40 of low spring constant to support the spring 40 concentrically. The flange portion 24 extends from the edge of the cylindrical protion 22 toward the radially outside. With l 1 the total length of the first spring seat 20, W2 the circumferential width of openings 8 and 9 as shown in FIG. 1, L 1 the space corresponding to the angle $\theta 1$ between the first and second spring seats 20 and 41, and L2 the movement quality corresponding to the angle $\theta 2$, the length l 1 is determined by $$l\,1 < [W2 - (L2 - L1)]/2$$

Therefore, adjacent bottom portions 23 of first spring seats 20 will never be in contact with each other even if the relative movement reaches maximum quantity.

Figure 3:
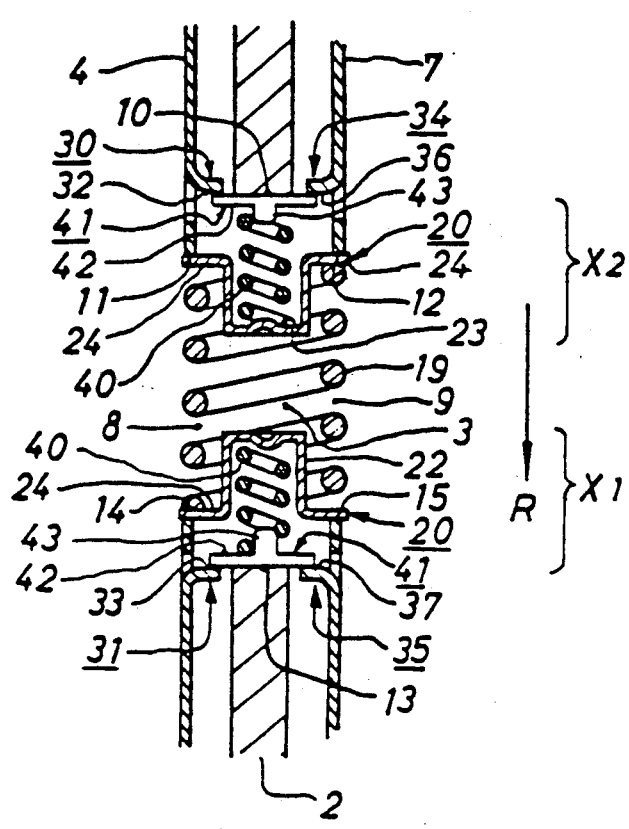
FIG. 3 is cross sectional view taken along line III—III of FIG. 1.

As shown in FIG. 3, each first spring seat 20 is positioned so that the flange portion 24 is in contact with the edges 11, 12, 14 and 15 of openings 8 and 9 and the cylindrical portion 22 is disposed in the large diameter spring 19.

Claws 30 and 1 are respectively, formed at adjacent opposite sides of the opening 8 an project inwardly perpendicular to the plate 4. The claws 30 and 31, respectively, form rectangular-shaped seats 32 and 33, flush, respectively, with end surfaces 10 and 13 of opening 3 of flange 2. Claws 34 and 35 are, respectively, formed at adjacent opposite sides of the opening 9 in plate 7 and project inwardly perpendicular to the plate 7 in alignment with claws 30 and 31 in plate 4. The claws 34 and 35, respectively, form rectangular-shaped seats 36 and 37 flush with seats 32 and 33 and the end surfaces 10 and 13 of opening 3 of flange 2. Each set of seats 32 and 36 and seats 33 and 37 secures ends of second spring seats 41, respectively. Each second spring seat 41 is made of the metal formed into disc shape, and has a projection 43 formed at its center. The projection 43 projects into the small diameter spring 40 so as to prevent the end portion of the small diameter spring 40 from leaving a concentric position. The diameter of the coil spring seat 42 is larger than the inside diameter of the cylindrical portion 22, so that the outer periphery of the coil spring seat 42 will contact the flange portion 24 of the first spring seat 20, as described later herein.

A part of the small diameter spring 40 is disposed in the cylindrical portion 22 of spring seat 20 so that one end is concentrically secured at the dome 25 of the bottom portion 23 and the other end is concentrically secured at the projection 43 of the second spring seat 41.

The operation of this embodiment is as follows. In an engaged condition, a torque of an engine is transmitted to the clutch plate 4 by way of the facing 6 and cushioning plate 5, shown in FIG. 1, so that retaining plate 7 is simultaneously driven in the same rotative direction R of the clutch plate 4. In the following explanation with reference to FIG. 3, forward and backward rotative direction R are respectively denoted X1 and X2.

Figure 4:
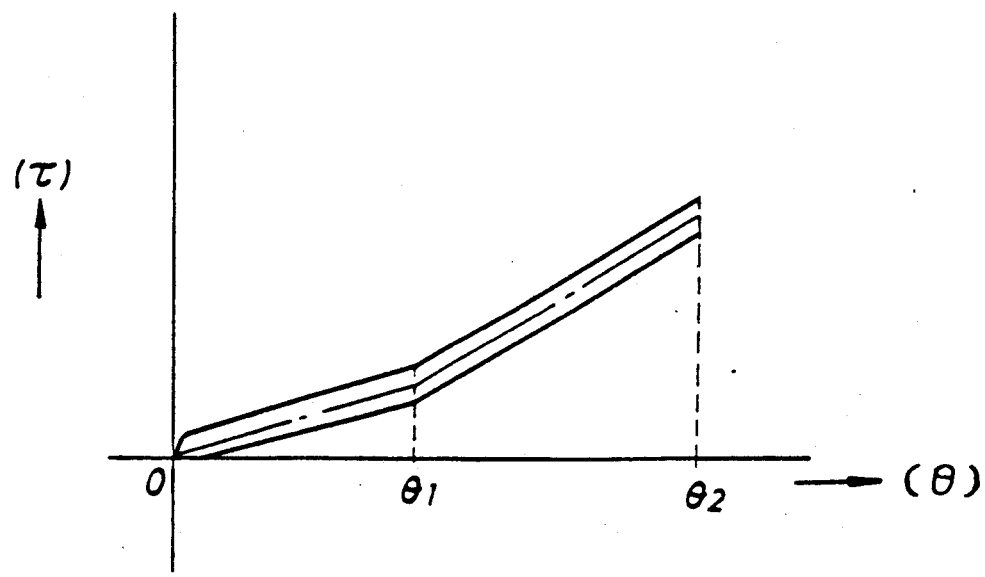
FIG. 4 is a graph showing a characteristic of the present invention.
Figure 5:
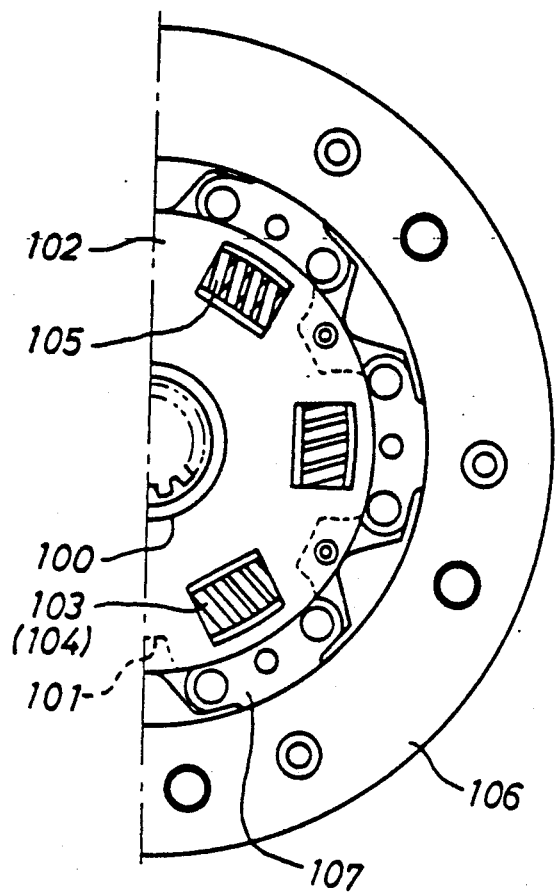
FIG. 5 is a partial front elevational view of a conventional clutch disc assembly.
Figure 6:
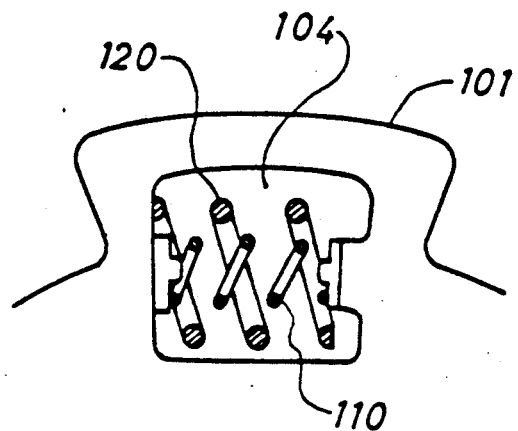
FIG. 6 is a front elevational view of a conventional hub flange.

The torque of plates 4 and 7 is transmitted to the first spring seat 20 in the X1 direction of rotation, by side edges 11 and 12 of the openings 8 and 9 in clutch plate 4 and retaining plate 7, respectively. In this relative movement, the large diameter spring 19 works as a rigid segment which transmits the torque in the direction R to the X1 side of first spring seat 20, so that X1 side of the first spring seat 20 approaches X1 side of the second spring seat 41. Thus, the X1 side of small diameter spring 40 is compressed, so that X1 side of the flange portion 24 contacts with the outer periphery of X1 side of the coil spring seat 42. The first stage $O-\theta 1$ shown in FIG. 4 is therefore obtained.

After X1 side of the coil spring seat 42 is in contact with X1 side of the flange portion 24, the small diameter spring 40 therebetween is no further compressed, but the large diameter spring 19 is compressed. After the large diameter spring 19 is compressed by predetermined value, the end surface 18 of recess 17 formed in the outer flange 2 shown in FIG. 1 is in contact with the stud pin 16, so that the second stage $\theta 1 - \theta 2$ shown in FIG. 4 is obtained.

After the end surface 18 of recess 17 is in contact with the stud pin 16, the outer flange 2 is simultaniously moved with the clutch plate 4 and retaining plate 7 in the direction R. While this rotation, continues the small diameter spring 40 tends to extend in the radially outward direction but, because spring 40 is inside of cylindrical portion 22 of spring seat 20 there is no possibility that the small diameter spring 40 can become meshed with the large diameter spring 19.

In this invention, as mentioned above, because the small diameter spring 40 is disposed in the cylindrical portion 22 of the first spring seat 20 disposed in the large diameter spring 19, inner space of the large diameter spring 19 is utilized to obtain the torsion characteristic having a multi-stage characteristic. Therefore, the length W1 of the opening 3 in the circumferential direction can be minimized by the buried length of the small diameter spring 40. The durability of the outer flange 2 of hub 1 can also be maintained despite of the wide torsion angle. Because the small diameter spring 40 is disposed in the cylindrical portion 22, there is no possibility that the small diameter spring 40 can become meshed with the large diameter spring 19. The large diameter spring 19 therefore maintains stable torsion characteristic. Further, according to the present invention, because the compressed quantity of the small diameter spring 40 is maintained after the second spring seat 41 is in contact with the flange portion 24 of the first spring seat 20, the durability of small diameter spring 40 is also improved.

INDUSTRIAL APPLICABILITY

This invention can be applied for automobile or construction vehicles.

I claim:

1. A clutch disc assembly comprising a hub spline fitted onto an output shaft; an outer flange formed on the hub; a clutch plate and a retaining plate respectively rotatably disposed at opposite sides of said outer flange; circumferentially spaced openings in said clutch plate, said retaining plate and said hub flange, said openings being aligned with each other at equal circumferential distance in a circumferential direction of said plates and of said hub flange; and a large diameter spring of high spring constant disposed in said openings in said plates, characterized by that said openings in said hub flange have a circumferential length W1 in the circumferential direction longer than a length W2 of said openings in said plates, the difference between said length W1 and said length W2 corresponding to a torsion and $\theta 1$ between said hub flange and said plates when the clutch is neutral; said larger diameter spring having hat-shaped first spring seats at the opposite ends of said large diameter spring, said first spring seats each having an integral radially, outwardly extending flange portion in engagement with an end of said large diameter spring and through which said large diameter spring is compressed, a cylindrical protion extending axially from the inner end of said spring seat flange and into said large diameter spring and a bottom portion formed integrally at the end of said cylindrical portion and forming a closure at said end; a small diameter spring of low spring constant having a portion at one of its ends disposed in said cylindrical portion of each of said hat-shaped first spring seats; a second spring seat at an opposite end of each said small diameter spring in each of said hat-shaped first spring seats; each said second spring seat having a flange in contact with said opposite end of each said small diameter spring, said each said second spring seat flange having an outer periphery for contact with a surface of said radially outwardly extending flange portion of a first spring seat when relative movement between said outer flange on said hub and said plates exceed said torsion angle $\theta 1$; and claws formed, respectively, at opposite side edges of said openings in said clutch plate and said retaining plate for engaging said second spring seat flanges at opposite ends of said openings in the absence of said relative movement between said outer flange of said hub and said plates.

2. A clutch disc assembly according to claim 11, wherein said bottom portion of said first spring seat has a dome projecting into said portion of said small diameter spring in said cylindrical portion.

3. A clutch disc assembly according to claim 1 or 2 wherein said outer hub flange has at least one circumferentially extending recess at the peripheral outer edge of said outer hub flange and having radially outwardly extending walls, said clutch plate and said retainer plate are joined by a stud pin connected at opposite ends to said plates and aligned with said circumferentially extending recess between said radial end walls of said recess and wherein the total length l 1 of said first spring seat is determined by $$l\,1 < [W2 - (L2 - L1)]/2$$

where W2 is the circumferential length of said openings in said plates, L1 is the distance, at one end of said openings in said plates, between said radially and outwardly extending flange portion on a hat-shaped first spring seat at said end of said opening and said flange of said second spring seat at said opening, and L2 is the movable distance between said outer hub flange and said plates between said stud pin and a radial wall of said flange recess.

* * * * *